H. P. L. LAUSSUCQ.
VULCANIZING PRESS.
APPLICATION FILED AUG. 20, 1921.
1,412,119. Patented Apr. 11, 1922.
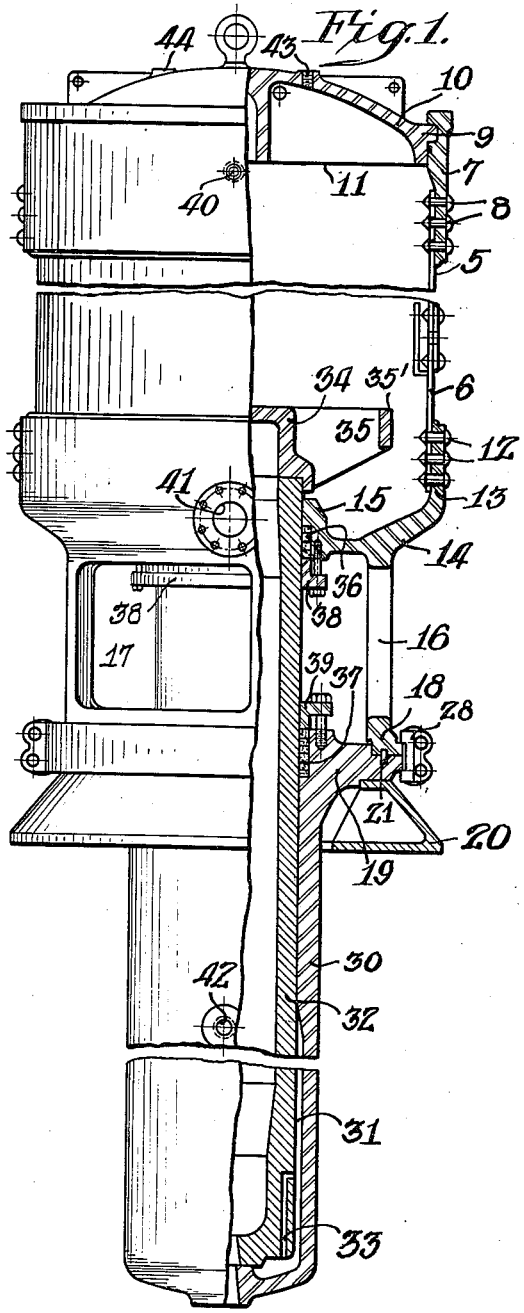
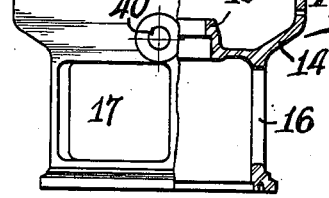
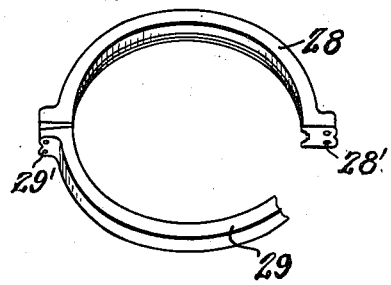
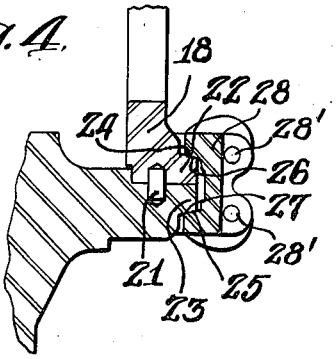
INVENTOR.
Henri P. L. Laussucq
BY
ATTORNEY.

UNITED STATES PATENT OFFICE.

HENRI PIERRE LAURENT LAUSSUCQ, OF READING, PENNSYLVANIA, ASSIGNOR TO BIRDSBORO STEEL FOUNDRY & MACHINE COMPANY, OF BIRDSBORO, PENNSYLVANIA, A CORPORATION OF PENNSYLVANIA.

VULCANIZING PRESS.

1,412,119.      Specification of Letters Patent.      Patented Apr. 11, 1922.

Application filed August 20, 1921. Serial No. 493,970.

*To all whom it may concern:*

Be it known that I, HENRI PIERRE LAURENT LAUSSUCQ, a citizen of the United States, residing at Reading, Pennsylvania, in the county of Berks and State of Pennsylvania, have invented a certain new and useful Vulcanizing Press, of which the following is a specification.

My invention relates to vulcanizing presses such as are used for holding the tire molds firmly closed while automobile tires are being vulcanized.

A purpose of my invention is to maintain absolute alinement between the axes of the press plunger and the "body" comprising the tire-receiving chamber or cylinder of the press.

A further purpose is to support the press chamber from a stand which forms its bottom and is mounted upon and preferably rigidly attached to the plunger-operating cylinder.

A further purpose is to rigidly fasten a stand forming part of the bottom of the press cylinder to the plunger-operating cylinder by a clamp, which wedges in action and whose retaining devices are out of line with the direction of strain.

A further purpose is to guide the operating plunger near its upper end by the stand upon which the press cylinder rests.

Further purposes will appear in the specification and in the claims.

I prefer to illustrate my invention by but one form, which has proved to be practical, efficient, extremely rigid and commercially acceptable, and which, at the same time, well illustrates the principles of my invention.

Figure 1 is an elevation, partly in section of the preferred form of my invention.

Figure 2 is a similar view showing my stand which forms the bottom of the press cylinder and connects it with the plunger-cylinder.

Figure 3 is a broken perspective view of a clamp shown in Figure 1.

Figure 4 is a fragmentary section, showing the clamp in position retaining the parts.

In the drawings similar numerals indicate like parts.

In the manufacture of tires every effort has been made to secure rigidity of the vulcanizing "unit" including the press, the ram and the ram-cylinder and perfect alinement of the ram with respect to the press, in order to avoid unequal pressures upon the tire molds. I have approached this from the standpoint of carrying the effective press cylinder down as far as possible integrally and clamping the stand by which this is accomplished to the plunger-cylinder with great rigidity.

In the drawings I have shown a vulcanizer casing 5 for receipt of the tires, having a cylindrical shell 6 and a top ring 7 held to it by riveting at 8. The cap fastenings are intended to be of the usual bayonet form at the edge 9 for a cap 10. The cap is transversely ribbed at 11 to afford upward abutment for the tire molds.

At the lower end I rivet the shell or casing 6 at 12 to the band 13 of a flange 14 of my stand, which forms the bottom of the press cylinder at the same time that it supports the cylinder. This stand carries an integral inwardly directed flange 15. The lower part of the stand comprises ribs 16, providing openings 17, and closed at the bottom by a ring 18; so that the bottom of the press cylinder is extended "integrally" and therefore with the greatest rigidity clear down to the point at which the stand is to be attached to the plunger-cylinder. This is valuable in itself but is particularly effective in connection with my rigid clamp by whch these parts are joined.

The connection between the stand and the plunger cylinder is made by clamping the ring upon the rim 19 of the cylinder, on which it rests. The "unit", in turn, rests upon a base 20.

Studs 21 are shown fitting into the ring and rim respectively, and the outer meeting parts of the ring and rim are flanged at 22 and 23 to present tapered annular surfaces 24 and 25 facing upwardly and downwardly, respectively to cooperate with the tapered annular surfaces 26 and 27, facing downwardly and upwardly, respectively, of half clamps 28 and 29 drawn together by bolts passing through holes 28', 29'.

The wedge action of the clamp against the upper and lower surfaces of the meeting members clamps them together so rigidly that, in my experience, no take-up is required subsequently. However, the construction permits of quick and easy tightening of the parts at any time should any looseness appear.

The rim 19 is cast integrally with a plunger cylinder 30 whose bore is enlarged at 31 to provide fluid space near the bottom about the plunger or ram 32. A passage 33 is shown for the purpose of providing free flow of operating fluid to the atmosphere when the ram passes the safe limit of stroke.

The plunger or ram 32 is surmounted by a cap 34 having transverse ribs 35 connected by a ring 35' to afford a lower head to engage the bottom tire mold during the operation of the press.

It will be noted that the plunger is given a bearing against the cylinder walls, extending in length much in excess of the diameter of the cylinder, giving additional steadying support and cooperating with the spaced bearing in the bottom of the casing to secure and maintain great accuracy or alignment throughout the movement of the arm with unusual smoothness to its travel. This feature combines with the rigidity of connection secured between the casing and plunger cylinder to give stability and perfect alignment at all times.

The engagement of the flange 15 with the ram gives side support to the ram directly from the stand and at the upper end of the ram, protecting effectively against axial deviation.

Leakage of steam from the vulcanizing chamber and of water from the hydraulic cylinder are prevented by stuffing boxes in which packing 36 and 37 are held in position by glands 38 and 39. The glands are accessible through the openings at 17.

Steam inlet to the curing chamber is provided through a series of openings 40 with exhaust at 41 and water is admitted to and exhausted from the plunger cylinder by a connection at 42. The gauge and air bag connections are shown at 43 and 44.

When the parts are assembled, the clamp members 28 and 29 are tightened rigidly to bring the ring 18 into engagement with the flange 19 at a pressure much in excess of the pressure due to the weight of the parts above the ring and to maintain these parts in rigid position as initially set. The tightening bolts are under no shearing strain.

I have particularly sought to avoid the error into which many others working in this art have fallen, of merely resting the cooperating parts, one upon the other, usually resting the plunger cylinder merely within the base, for example, so that movement may take place between it and the base, resulting in relative movement between the press and plunger members.

Because my entire press and plunger unit is rigidly coupled together and rests upon the base 20, as a unit, movement of the unit with respect to the base does not affect the alignment of the parts; with the result that my vulcanizing cylinder and its plunger connections are independent of ordinary erection faults and conditions and maintain more reliable alignment than others which merely rest the plunger cylinder in or upon the other parts.

I am aware that changes can be made in my structure by those skilled in the art and in view of my disclosure herein, so as to avoid direct copying and yet to secure all or a considerable part of the benefit of my invention; and it is my purpose to include all such within my claims as come within the reasonable spirit and scope of my invention.

Having thus described my invention, what I claim as new and desire to secure by Letters Patent is:

1. In a vulcanizing press for tires, a casing forming a vulcanizing chamber, a stand therefor, forming a bottom for the casing, a plunger cylinder having a rim rigidly attached to the stand and a plunger in said plunger cylinder guided by the stand.

2. In a vulcanizing press for tires, a casing forming a vulcanizing chamber, a stand therefor, forming a bottom for the casing, a plunger cylinder having a rim rigidly attached to the stand, a plunger in said plunger cylinder guided by the stand and a base upon which the plunger cylinder rests.

3. In a vulcanizing press for tires, a casing forming a vulcanizing chamber, a stand therefor, forming a bottom for the casing, having ribs extending downwardly from the bottom and a ring integral with the ribs, a plunger cylinder having a rim, the ring and rim having tapered outer surfaces, laterally movable clamp wedging means for holding the ring and rim together and a plunger within the plunger cylinder and extending into the vulcanizing chamber.

4. In a vulcanizing press for tires, a casing forming a vulcanizing chamber, a stand therefor, forming a bottom for the casing, having ribs extending downwardly from the bottom and a ring integral with the ribs, a plunger cylinder having a rim, the ring and rim having tapered outer surfaces, laterally movable clamp wedging means for holding the ring and rim together and a plunger within the plunger cylinder and extending into the vulcanizing chamber and guided at its upper end by the stand which forms the bottom of the casing.

5. A vulcanizing cylinder, a stand therefor forming a bottom for the cylinder, a ring integral with the stand, a plunger cylinder, a rim thereon upon which the ring rests, rigid retaining devices between the ring and rim, and a plunger for the plunger cylinder engaging said cylinder near its lower end and engaging the stand near its upper end to guide and support the plunger in axial movement.

6. A vulcanizer casing having a cast bottom, downwardly extending ribs therefrom, and a ring joining the ribs and integral with said bottom forming a stand, a plunger cylinder, a rim thereon upon which the ring rests, clamping means for holding the ring to the cylinder throughout its circumference, a base upon which the rim rests, supporting the vulcanizer casing and plunger cylinder as a unit and a plunger within the plunger cylinder and extending into the vulcanizing casing.

7. In a tire vulcanizer press, a vulcanizer casing having a bottom, spaced ribs and a ring joining the ribs, all integral with the said bottom, to form a stand adapted to guide a plunger, a plunger cylinder, a rim thereon, the ring and flange having outer, upper and lower surfaces, respectively combining to form a wedge, a clamp having interior corresponding wedge surfaces and adapted to be moved laterally to engage the first named surfaces and wedge the parts into rigid junction, a plunger in the cylinder engaging the stand and the side walls of the plunger cylinder to guide and laterally support the plunger, and packing for the bottom of the casing and for the plunger cylinder.

8. A tire vulcanizer comprising a vulcanizing chamber, a plunger cylinder and a stand between rigidly united to the casing and cylinder, in combination with a plunger for the cylinder entering the casing and having bearings against lateral movement spaced by the stand, one in the casing and the other in the cylinder.

9. A vulcanizer press, comprising a vulcanizer casing, a plunger cylinder and a stand rigidly united to both in combination with a plunger for the cylinder, having bearing in the cylinder throughout a cylinder length considerably in excess of the diameter of the cylinder and having bearing in the bottom of the casing.

10. A vulcanizing cylinder, a stand therefor forming a bottom for the casing, a ring integral with the stand, a plunger cylinder, a rim thereon upon which the ring rests, rigid retaining devices between the ring and rim, and a plunger for the plunger cylinder engaging the cylinder thoughout a cylinder length much in excess of its diameter and engaging the bottom of the casing near its upper end to guide and support it in axial movement.

HENRI PIERRE LAURENT LAUSSUCQ.